United States Patent [19]

Blackett

[11] Patent Number: 4,742,798
[45] Date of Patent: May 10, 1988

[54] INCUBATOR AND METHOD OF INCUBATION AND HATCHING FISH EGGS AND FRY

[75] Inventor: Roger F. Blackett, Kodiak, Ak.

[73] Assignee: State of Alaska, Juneau, Ak.

[21] Appl. No.: 826,215

[22] Filed: Feb. 5, 1986

[51] Int. Cl.⁴ ............................................ A01K 61/00
[52] U.S. Cl. ................................................... 119/3
[58] Field of Search .................................... 119/2, 3, 4

[56] References Cited

U.S. PATENT DOCUMENTS

| | | | |
|---|---|---|---|
| 3,727,579 | 4/1973 | Lee | 119/2 |
| 4,098,230 | 7/1978 | Jackson | 119/3 X |
| 4,180,012 | 12/1979 | Zenger, Sr. | 119/3 |
| 4,212,268 | 7/1980 | Chapman | 119/3 X |
| 4,221,187 | 9/1980 | Casey | 119/3 |
| 4,457,441 | 7/1984 | McCloughan | 119/3 X |

Primary Examiner—David A. Scherbel
Assistant Examiner—Creighton Smith
Attorney, Agent, or Firm—Fliesler, Dubb, Meyer & Lovejoy

[57] ABSTRACT

An incubator for hatching fish eggs and incubating fry including a housing suitable for holding water, having a floor and a top. A pressure plate for evenly distributing pressure in the upper portion of the housing spaced above the floor. The housing having an inlet below the pressure plate and an outlet above the pressure plate. Biological substrates having openings resting on and above the pressure plate. The substrates are made from materials suitable for incubating fish eggs and supporting fry. Whereupon water flowing from the inlet to the outlet creates an upwelling waterflow through the pressure distributing means and biological substrate.

24 Claims, 2 Drawing Sheets

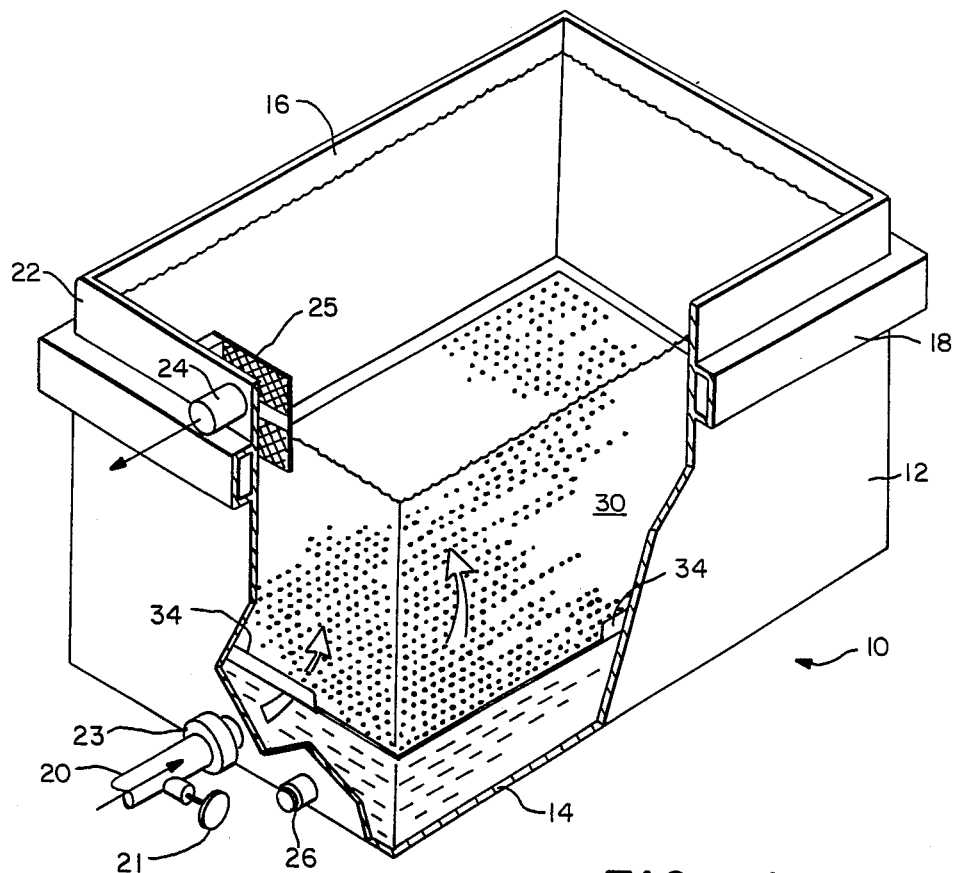
FIG.—1
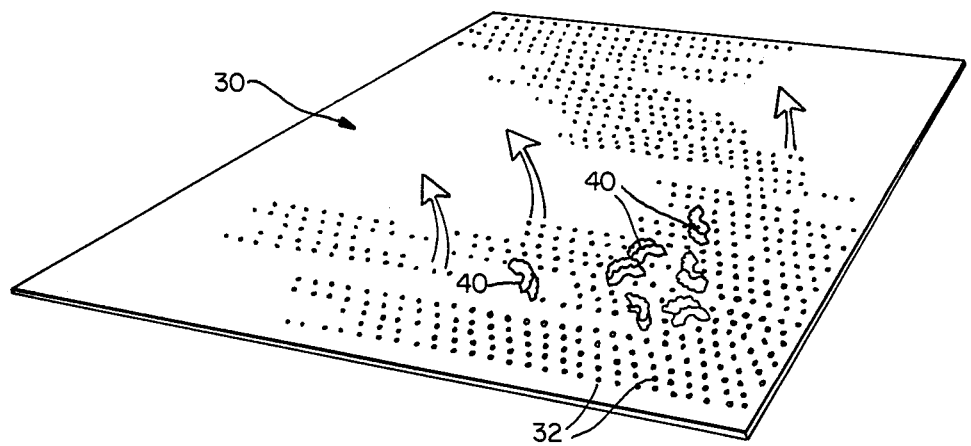
FIG.—2

INCUBATOR AND METHOD OF INCUBATION AND HATCHING FISH EGGS AND FRY

FIELD OF INVENTION

This invention relates generally to incubators, and more particularly to incubators for hatching salmon in a hatchery system.

BACKGROUND

At the heart of the hatchery system is the incubator. It is the incubator that provides the environment for giving life to the fertilized egg and safeguards the survival of the emergent fry. The first incubators that were developed were of a deep matrix type attempting to simulate natural conditions. A standard incubator consisted of birds eye and pea gravel and successive layers of crushed rocks and eggs. This standard incubator satisfied many of the physiological and behavioral requirements of the embryo and eleutheroembryo (embryo after hatching).

However, there remain some difficulties with this type of incubator. Firstly, space requirements for operation and maintenance of this type of incubator are not practical for salmon production. Huge amounts of space are necessary for the gravel and crushed rock. Additionally, the handling and cleaning of the tons of rock and gravel annually in a production hatchery result in tremendous costs. The costs diminish the economic advantages of improved eyed-egg to fry survival rates in the deep matrix incubator.

With the increase in demand by commercial, sport and subsistence fishermen for additional salmon, an industry-wide need for practical and efficient incubators developed. The deep matrix incubator left this demand unsatisfied because of its space and maintenance requirements.

It was left to the Applicant to develop a practical and efficient incubator which increased the survival rate of the fry as well as the hatch rate and the quality of the adult fish at an economically feasible cost.

SUMMARY OF INVENTION

It is thereby an object of this invention to provide a practical and economically efficient incubator within a hatchery system.

It is an additional object of the invention to maximize the use of hatchery space for production of fish.

It is a further object of the invention to provide an incubator capable of producing a high hatching rate and a high survival rate for fish fry.

In addition to the foregoing, Applicant noticed that in incubators without substrates, once the fish were hatched, they expended energy in swimming. Thus, the yoke sac material at a critical stage of their life was used for survival and not for growth. In response to that, Applicant developed his invention which provides a constant stream of oxygenated water while the emergent fry are supported in place by substrates.

Using the instant invention, the emergent fry devote their yoke sac nourishment to growth instead of active swimming and survival. This also encourages shorter emergent periods for the fry. The quicker the fry emerge from the incubator after yoke absorption, the better, because the fry can then begin normal feeding and growth when there is a more plentiful food supply in their natural environment. Further, the fry may be released when water temperatures do not inhibit feeding. Thus the fry may be released into the natural environment at the best possible time because of their rapid emergence from the incubator.

In response to the industry-wide needs discussed above and as a result of Applicant's knowledge and observation, he has invented the following incubator which comprises:

a housing having a floor and a top, said housing being suitable for holding water;

means, spaced above the floor, for distributing pressure evenly throughout the housing, the housing having an inlet below the pressure distributing means and an outlet above pressure distributing means; and a biological substrate having openings resting on the pressure distributing means, the substrate being made from materials suitable for incubating fish eggs, whereupon water flowing from the inlet to the outlet creates an upwelling water flow through the pressure distributing means and biological substrate.

In the preferred embodiment, the pressure distributing means comprises a perforated plate of aluminum. As water flows from the inlet to the outlet, the plate acts as a means for distributing the pressure created by the water flow evenly throughout the upper portion of the incubator.

Fertilized eggs are placed on the biological substrates. The eggs rest there until they hatch into emergent fry. No time need be spent swimming because water is constantly upflowing through the incubator providing a constant stream of oxygen. Thus the fry are able to devote their egg sac nourishment entirely to growth instead of survival while being supported by the substrates.

The size of incubators in accordance with the invention are approximately two feet wide by three feet long by two feet deep. This comprises a shallow matrix type incubator. Many of these incubators may be laid side-by-side to maximuze use of hatchery space and maximize yield of salmon fry.

The shallow matrix type incubator in accordance with this invention has the advantage of economical and efficient operation and maintenance.

The incubator in accordance with this invention has the advantage of producing a shorter emergent period for the fry.

The incubator in accordance with this invention has the advantage of producing better fry, both in quality and size.

Other objects and advantages of the invention will be more fully appreciated with reference to the description of the drawing as follows.

BRIEF DESCRIPTION OF THE DRAWING

FIG. 1 is a perspective view of an incubator in accordance with this invention.

FIG. 2 is an elevated perspective plan view of a perforated plate in accordance with this invention.

DETAILED DESCRIPTION OF THE PREFERRED EMBODIMENTS

Figure 3:
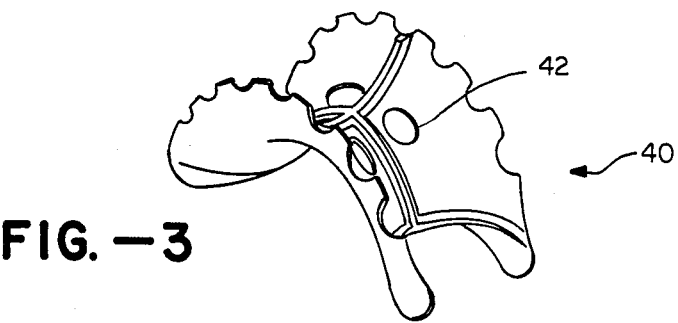
FIG. 3 is an enlarged perspective view of a biological substrate in accordance with this invention.

With reference to the drawing, generally and with particular reference to FIG. 1, there is shown the invention, an incubator for hatching fish eggs, generally indicated by the numeral 10. The incubator 10 comprises a housing 12 having four sides and a floor 14. The incubator has an open top 16.

The housing 12 is two feet wide, three feet long and two feet deep. The housing 12 is made from 3/16 inch thick 5086 aluminum. Alternatively, 6061 aluminum may be used successfully. The sides of the housing 12 are welded together to form a complete leakproof enclosure. Also alternatively, the housing may be made from ⅜ inch thick wood.

An outer rib 18 surrounds the housing defining a reinforcing member. The rib 18 strengthens and stiffens the housing 12. Additionally, when a system of incubators is desired, see FIG. 4 and the description thereof below, the outer rib 18 acts as structural support for the entire system. Where an incubator system is desired, as in FIG. 4, the individual incubators 10 are pushed together and the ribs 18 are of alternating heights, such that one rib 18 is higher than the adjacent incubator's rib 18 as will be explained more fully with reference to FIG. 4. Housing 12 includes an aluminum rib 18 comprising a channel of approximately 1½ inches in depth and three inches wide which spans the side of the housing 12. Alternatively, the incubator housing 12 may be reinforced from the inside. In this case, a reinforcing rib spans the sides of the interior of the housing 12. In this embodiment the reinforcing rib is located proximate to the top 16 of the housing 12. The rib may be thinner in this embodiment.

The housing 12 includes an inlet 20 proximate to the floor 14. The inlet 20 includes a valve 21 for regulating the flow of water through it. The inlet is approximately 1½ inches in diameter and is centered on side 22 of housing 12. The inlet 20 is located approximately two inches above the floor 14. The inlet 20 includes a filter 23 to strain debris and large particles from the water. Additionally, the inlet 20 includes a chemical at the filter 23 which treats the incoming water to prevent Saprolegnia.

The housing 12 includes an outlet 24 also centered on face 22 and approximately 2¼ inches from the top 16. The outlet 24 is approximately two inches in diameter.

After use and before reuse, it is good practice to thoroughly clean and disinfect the inside of the incubator 10. For that purpose, clean-out drain 26 is provided for washing out any debris collected at the bottom of the housing 12. Drain 26 is located proximate to the floor 14 and off-center on face 22.

With particular reference to FIG. 2, there is shown a perforated plate 30. The plate 30 is made from aluminum 5086. The plate 30 is 0.125 inches thick, having openings of 5/64 inch diameter. Alternatively, it is workable to have a plate with 3/32 inch holes. In either of the embodiments, the openings are made on ½ inch staggered centers to increase the rigidity of the plate 30 and to discourage stress crack propagation. The housing 12 further includes an angle bracket 34 strategically placed within housing 12 as illustrated. The angle bracket 34 is positioned such that the perforated plate 30 is approximately four inches above the floor 14 when resting and attached to the angle bracket 34. It will be noticed that the inlet 20 is below the perforated plate 30 and the outlet 24 is above the perforated plate 30. Alternatively, the perforated plate 30 can be welded in place eliminating the need for angle bracket 34.

Water entering the inlet 20 must flow through the perforated plate 30 in order to pass out outlet 24. The perforated plate 30 acts as a means for distributing the water pressure uniformly throughout the upper part of the incubator 10. As will be appreciated hereinafter, the fish eggs lie in the upper portion of the incubator 10 and it is important to evenly distribute pressure throughout the upper portion above the perforated plate 30 of the incubator 10.

The openings 32 in the perforated plate 30 are made by a punching method. A rough side is created through this method of making openings. The rough side is placed away from the floor 14 and facing the top 16 of the housing 12. Additionally, the outlet 24 is a threaded coupling which is ground smooth to permit fry to flow out of the incubator 10 with a minimum of damage to the fry. All welds of the incubator 10 are ground smooth to assure removal of sharp edges to prevent damage to the fry.

With particular reference to FIG. 3, there is shown a biological substrate 40. The substrate 40 includes openings 42 which allow water upflowing from the inlet 20 to the outlet 24 to pass through the substrate 40 relatively unobstructed. The substrate is made from polyvinylchloride. The substrate accommodates a greater density of salmon fry than gravel. The openings create a greater void space and thereby produce less pressure drop in the upwelling water flowing through the incubator. The light specific gravity of the PVC material allows easy handling of the substrate into and out of the incubator. The substrate 40 may or may not include eggs. The substrate as designed minimizes crushing eggs and the light weight is helpful in incubator maintenance. The substrate 40 supports the fry during early development and produces heavier and better quality fry for release. Unsupported fry expend more energy for continuous swimming and greater utilization of yoke sac material which is used for energy instead of growth. A particular biological substrate called by the trade name Intalox Saddle, manufactured by Norton Co. of Akron, Ohio has been found useful.

The substrates 40 are placed on the perforated plate 30 and eggs are loaded on to the substrates 40. When it is desirable to have more than one layer of eggs, another row of substrates 40 is placed over the first layer of eggs and an additional layer of eggs is placed on the second set of substrates 40. It has been found successful to load the eggs within two inches of the outlet 24.

Incubator 10 has a minimum of ten gallons per minute of water flow entering the inlet 20. This level of pressure creates sufficient force to cause adequate water flow across the plate 30 to cause a continuous oxygen supply to the eggs in the incubator 10 and to force water out of outlet 24. A filter is genergally provided at the inlet 20 and the pressure flow must still be ten gallons per minute after passing through the filter.

In some cases it will be desirable to incubate fertilized eggs that have not reached the eyed stage. In this case, a plastic netting is placed on top of the perforated plate 30 instead of the biological substrates 40. The particular plastic netting called Vexar, a registered trademark of E.I. DuPont De Nemours & Co., has been found useful for this purpose. The fertilized eggs are loaded into the incubator within two inches of the outlet 24. After the eggs have reached the eyed stage, they are separated and sorted so that the dead eggs are discarded. The netting is used to easily remove the eggs close to the plate 30.

Figure 4:
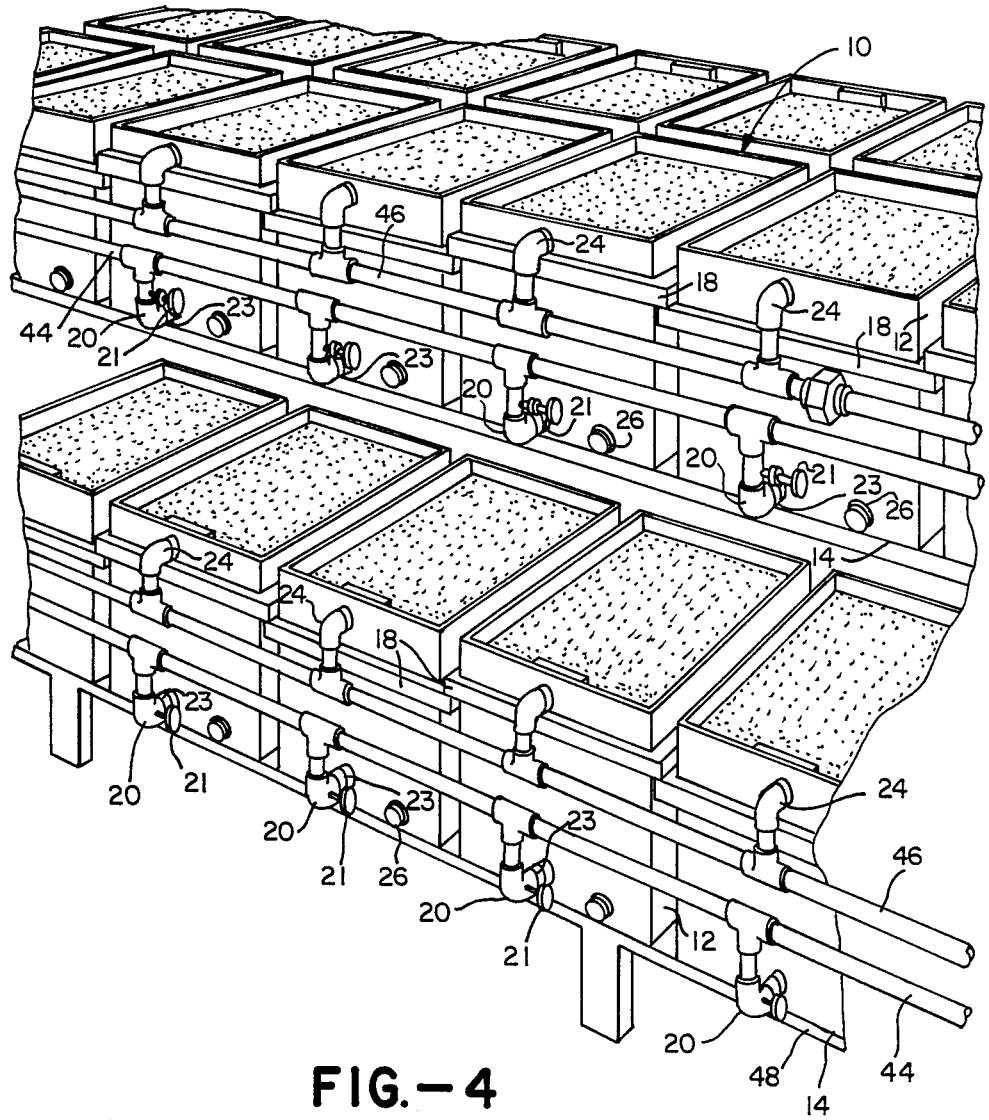
FIG. 4 is a perspective view of a system of incubators in accordance with this invention.

With particular reference to FIG. 4, there is shown a system of incubators in accordance with this invention. The incubators 10 are all as described with reference to FIG. 1. The system includes a common inlet pipe 44 and a common outlet line 46. In order to maximize space efficiency, the incubators are stacked on a rack 48. As described with reference to FIG. 1, each of the incubators 10 has an outer rib 18 which alternates in height from incubator to incubator. As shown in FIG. 4, the middle incubator has a lower rib 18 upon which the outer incubator ribs 18 rest, thereby increasing rigidity and space efficiency for the system of incubators. As mentioned above, the reinforcing rib may be inside the incubator at the top. This provides direct side-by-side support by adjoining incubators in a incubator system.

The invention also includes a method of incubating fertilized fish eggs to the eyed stage. The incubator 10 includes the plastic netting lowered through the top 16 and resting upon the perforated plate 30. Water flows continuously from the inlet 20 to the outlet 24 during this process. Fertilized eggs are then loaded on to the netting and perforated plate 30 approximately two inches below the outlet 24. Current fertilized egg loading densities are 700,000 to 800,000 pink salmon eggs to the eyed-egg stage of incubation. The fertilized eggs are incubated until they reach the eyed stage. Upon reaching the eyed stage, the eggs are removed manually, separating the dead eggs and discarding them. The eggs at the bottom of the incubator are lifted out of the incubator 10 by lifting the netting.

This invention also includes a method of incubating eyed-eggs to the fry stage. Biological substrates 40 are placed on the perforated plate 30 so that the horizontal space of the perforated plate 30 is completely filled with substrates 40. Eyed-eggs are then loaded on top of the biological substrates 40. Approximately half of the eggs are loaded on to this layer of substrates 40. A new layer of substrates 40 is placed on top of the first layer of eggs until the horizontal surface of the eggs is again completely full of substrates 40. The remaining eggs are then loaded on top of the substrates 40 forming a second layer of eggs. The eggs are loaded within approximately two inches of the incubator top 16. Current eyed egg loading densities for production are approximately 420,000 pink salmon eggs or 350,000 chum salmon eggs per incubator.

A screen is provided at the incubator outlet 24 to prevent early emergent fry from flushing out of the incubator. It will be appreciated that the outlet 24 may be covered with a perforated plate to retain fry in the incubator during emergence. The outlet 24 includes a screen 25 for retaining fry in the incubator 10. In an alternative embodiment, the outlet 24 includes a removable screen which hangs by means of an angle bracket which spans two adjacent sides.

The incubators are plumbed so that emergent fry may pass out of the outlet 24 into the common outlet pipe 46 as shown with reference to FIG. 4 at the desired time. At that point, the fry can either be counted and released via pipes into a bay or into rearing pens or simply held in a common holding tank for other procedures such as marking, sampling and the like.

After the emergent fry have been removed from the incubator 10, the incubator 10 is thoroughly washed to remove any residual organic material from the inner sides and disinfected to kill disease-bearing organisms. The perforated plate 30 may be similarly removed and cleaned or left in place. The removeal of the perforated plate 30 facilitates cleaning under the plate, but normally backflushing is sufficient. The drain 26 is opened at the floor 14 of the incubator and water is backflushed against the plate and in the lower portion of the incubator to fully clean the incubator 10. This disinfection process should be followed by flushing the incubator for at least 24 hours before resuming operation.

It will be appreciated that while the instant invention has been described with respect to a particular incubator and a particular perforated plate, that other incubators having an inlet below the perforated plate and an outlet above the perforated plate to create an upwelling waterflow may similarly fall within the scope of this invention. Thus the detail and the specific dimensions described above are not meant to be limiting of Applicant's invention, but rather to be useful in the instruction for making and disclosing Applicant's invention. Applicant thereby states that he is not limited by the above description, but rather only with respect to the appended claims.

I claim:

1. An incubator for hatching fish eggs, comprising:
   a housing having a floor and a top, said housing being suitable for holding water;
   means, spaced above the floor, for distributing pressure evenly throughout the housing, the housing having an inlet below the pressure distributing means and an outlet above the pressure distributing means;
   a biological substrate having openings resting on the pressure distibuting means, the substrate being made from materials suitable for incubating fish eggs; and
   means for delivering water under a variable pressure to the inlet so as to create an upwelling flow of water through the incubator.

2. An incubator for hatching fish eggs and incubating fish fry, as set forth in claim 1, wherein the inlet is adapted to permit a ten gallon per minute flow of water.

3. An incubator for hatching fish eggs and incubating fish fry, as set forth in claim 1, wherein the pressure distributing means comprises a perforated plate.

4. An incubator as set forth in claim 1, wherein the housing comprises a shallow matrix incubator having a depth of between 1.5 and 2.5 feet.

5. An incubator as set forth in claim 1, wherein the inlet and the outlet lie generally in the same vertical plane and are centered on that plane.

6. An incubator as set forth in claim 5, wherein the housing is rectangular in shape, wherein the inlet is approximately two inches above the floor of the housing, and wherein the outlet is approximately two inches below the top of the housing.

7. An incubator as set forth in claim 6, wherein the inlet is approximately 1½ inches in diameter, and the outlet is approximately 2 inches in diameter.

8. An incubator as set forth in claim 6, wherein the incubator has an open top.

9. An incubator as set forth in claim 1, wherein the housing has a drain with a plug positioned so that the drain is flush with the floor.

10. An incubator as set forth in claim 3, wherein the perforated plate is between three and five inches above the floor.

11. An incubator as set forth in claim 1, wherein the housing includes outside reinforcing members.

12. An incubator as set forth in claim 1, wherein the housing includes inside reinforcing members proximate to the top of the incubator housing.

13. An incubator for eyed-eggs, comprising:

a housing having a floor and a top, said housing being suitable for holding water;

a perforated plate, spaced above the floor, for distributing pressure evenly through the housing, the housing having an inlet below the perforated plate and an outlet above the perforated plate;

a first layer of biological substrates resting across the perforated plate, a first layer of eyed-eggs being restable upon the biological substrates; at least a second layer of biological substrates being restable across the first layer of eggs and another layer of eggs being loadable over the second layer of substrates, and each successive layer of substrates and eggs loaded to fill the incubator until the eggs are proximate to the outlet, whereupon water flowing from the inlet to the outlet creates an upwelling water flow through the perforated plate and biological substrate.

14. A method of incubating fertilized fish eggs to the eyed stage comprising the steps of:

providing an incubator comprising a housing having a floor and being suitable for holding water, the incubator further having a perforated plate, spaced above the floor, for distributing pressure evenly through the housing, the housing having an inlet below the perforated plate and an outlet above the perforated plate;

placing a netting over the perforated plate;

flowing water from the inlet to the outlet to create an upwelling water flow;

loading fertilized eggs onto the netting over the perforated plate while water is flowing; and after the eyeing of the eggs, removing the eggs manually and removing the eyed eggs at the bottom of the incubator by lifting the netting over the perforated plate out of the incubator.

15. A method of incubating eyed-eggs to the fry stage comprising the steps of:

providing an incubator having a housing, the housing having a floor and being suitable for holding water, the incubator further having a perforated plate, spaced above the floor, for distributing pressure evenly through the housing, the housing having an inlet below the perforated plate and an outlet above the perforated plate;

placing a first layer of biological substrates on top of the perforated plate;

loading eyed-eggs on the first layer of biological substrates; and placing a subsequent layer of biological substrates over the first layer of eyed-eggs; and placing a subsequent layer of eyed-eggs on the biological substrates while water is upflowing 16. The method of claim 15, wherein a series of biological substrates and layers of egg are laid over the first set of substrates and eggs until the last loading of eggs is just below the outlet.

17. A system of incubators, each incubator comprising:

a housing having a floor and a top, said housing being suitable for holding water and including outside reinforcing members;

means, spaced above the floor, for distributing pressure evenly through the housing, the housing having an inlet below the pressure distributing means and an outlet above the pressure distributing means;

a biological substrate having openings resting on the pressure distributing means, the substrate being made from materials suitable for incubating fish eggs; and means for delivering water under pressure to the inlet so as to create a single pass upwelling flow of water through the incubator;

wherein the incubators are side-by-side with the reinforcing members alternating in heights such that a reinforcing member of one incubator rests alternately on another incubator in side-by-side relation.

18. An incubator for hatching fish eggs, comprising:

a housing having a floor, the housing being suitable for holding water, the interior of the housing being accessible from the top;

pressure distributing means spaced above the floor of the housing, the housing having an inlet below the pressure distibuting means and an outlet above the pressure distributing means;

water supply means for supplying water under a variable pressure to the inlet of the incubator, the water supplied by the water supply means not having passed through any other incubator; and water takeoff means for taking water from the outlet of the incubator, the water taken from the outlet of the incubator being discharged without passing through any other incubator.

19. An incubator according to claim 18, wherein the housing is approximately 2' by 3' in plan and approximately 2' deep, wherein the water supply means supplies waters at approximately 10 gallons per minute to the incubator, and wherein the incubator is loaded with approximates 800,000 eggs for incubation to the eyed stage, approximately 420,000 eyed eggs for incubation of pink salmon to the stage of emergent fry, or approximately 350,000 eyed eggs for incubation of chum salmon to the stage of emergent fry.

20. An incubator according to claim 18, wherein the housing further has a pluggable cleaning opening disposed in a wall of the housing and flush with the floor to facilitate cleaning under the pressure distibuting means.

21. An incubator according to claim 18, further comprising a fry retention screen disposed so as to block exit of fry through the outlet, the fry retention screen being removable to permit fry release at a desired time.

22. An incubator according to claim 21, wherein the outlet is sufficiently large and disposed sufficiently below the top of the housing to maintain the water level in the incubator sufficiently low to prevent emergent fry from jumping over the top of the housing and out of the incubator.

23. An incubator according to claim 18, further comprising:

a first layer of biological substrates resting on the pressure distribution means, the substrates being made from materials suitable for incubating fish and being adapted to permit upward water flow therethrough;

a first layer of eyed eggs resting on the first layer of biological substrates;

at least a second layer of biological substrates resting on the first layer of eggs and another layer of eggs resting over the second layer of substrates, and each successive layer of substrates and eggs loaded to fill the incubator until the eggs are approximate to other outlet.

24. An incubator for hatching fish eggs, comprising:

a housing having a floor, the housing being suitable for holding water, the interior of the housing being accessible from the top;

a perforated pressure plate, disposed substantially parallel to the floor and spaced above the floor, the housing having an inlet below the pressure plate and an outlet above the pressure plate;

water supply means for supplying water under a variable pressure to the inlet of the incubator, the water supplied by the water supply means not having passed through any other incubator;

water takeoff means for taking water from the outlet of the incubator, the water being taken from the outlet of the incuator being discharged without passing through any other incubator;

the housing further having a pluggable cleaning opening disposed in a wall of the housing and flush with the floor to facilitate cleaning under the pressure plate;

a fry retention screen disposed so as to block exit of fry through the outlet, the fry retention screen being removable to permit fry release at a desired time, the outlet being sufficiently large and disposed sufficiently below the top of the housing to maintain the water level in the incubator sufficiently low to prevent emergent fry from jumping out the top of the incubator;

the incubator being apable of being loaded with:

a first layer of biological substrates resting on the pressure plate, the substrates being made form materials suitable for incubating fish and being adapted to permit upward water flow therethrough;

a first layer of eyed eggs being restable on the first layer of biological substrates;

at least a second layer of biological substrates being restable on the first layer of eggs and another layer of eggs being loadable over the second layer of substrates, each successive layer of substrates and eggs loaded to fill the incubator until the eggs are proximate to the outlet.

* * * * *